US012097707B2

(12) United States Patent
Nakano et al.

(10) Patent No.: US 12,097,707 B2
(45) Date of Patent: Sep. 24, 2024

(54) WIPING DEVICE, IMAGE FORMING APPARATUS AND WIPING METHOD

(71) Applicant: KYOCERA Document Solutions Inc., Osaka (JP)

(72) Inventors: Issei Nakano, Osaka (JP); Takuma Araki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 105 days.

(21) Appl. No.: 17/935,793

(22) Filed: Sep. 27, 2022

(65) Prior Publication Data

US 2023/0115621 A1 Apr. 13, 2023

(30) Foreign Application Priority Data

Sep. 28, 2021 (JP) ................................ 2021-158255

(51) Int. Cl.
*B41J 2/165* (2006.01)

(52) U.S. Cl.
CPC ................................ *B41J 2/16535* (2013.01)

(58) Field of Classification Search
CPC ........................ B41J 2/16535; B41J 2/16538; B41J 2/16552; B41J 2/16585; B41J 2002/16558; B41J 2002/16573; B41J 25/001; B41J 2/16508
USPC ........................................................ 347/33
See application file for complete search history.

(56) References Cited

U.S. PATENT DOCUMENTS

2002/0171705 A1* 11/2002 Rhoads ................ B41J 2/16538 347/33
2007/0165063 A1* 7/2007 Horie .................. B41J 2/16508 347/33

FOREIGN PATENT DOCUMENTS

JP 2001-310476 A 11/2001

* cited by examiner

*Primary Examiner* — Jason S Uhlenhake
*Assistant Examiner* — Alexander D Shenderov
(74) *Attorney, Agent, or Firm* — Studebaker & Brackett PC

(57) ABSTRACT

A wiping device includes a wiping member and a moving part. The wiping member wipes a liquid off a nozzle surface of a recording head. The moving part moves the wiping member along the nozzle surface in a predetermined moving direction. The wiping member performs a first wiping operation in which the wiping member is moved while not coming into contact with the nozzle surface but coming into contact with the liquid adhering to the nozzle surface, and a second wiping operation in which the wiping member is moved while coming into contact with the nozzle surface after the first wiping operation.

6 Claims, 9 Drawing Sheets

WIPING DEVICE, IMAGE FORMING APPARATUS AND WIPING METHOD

INCORPORATION BY REFERENCE

This application is based on and claims the benefit of priority from Japanese patent application No. 2021-158255 filed on Sep. 28, 2021, which is incorporated by reference in its entirety.

BACKGROUND

The present disclosure relates to a wiping device which wipes a liquid off a nozzle surface of a recording head with a wiping member, an image forming apparatus and a wiping method.

An inkjet type recording apparatus is known, which is provided with a cleaning member which wipes the nozzle formed surface of the recording head. A head cover is attached to the recording head so as to cover the side surfaces perpendicular to the nozzle formed surface. The head cover is subjected to a water repellent treatment so as to reduce an amount of ink going around (moved) the side surfaces from the nozzle formed surface with the wiping operation by the cleaning member. As a result, it becomes possible to eliminate a problem such as a dropping of the ink from the recording head.

However, in the above-described technique, the ink may enter a slight gap between the side surfaces of the recording head and the head cover (a capillary phenomenon). If the ink that enters the gap may drop, a recording medium may be contaminated.

SUMMARY

In accordance with an aspect of the present disclosure, a wiping device includes a wiping member and a moving part. The wiping member wipes a liquid off a nozzle surface of a recording head. The moving part moves the wiping member along the nozzle surface in a predetermined moving direction. The wiping member performs a first wiping operation in which the wiping member is moved while not coming into contact with the nozzle surface but coming into contact with the liquid adhering to the nozzle surface, and a second wiping operation in which the wiping member is moved while coming into contact with the nozzle surface after the first wiping operation.

In accordance with an aspect of the present invention, an image forming f apparatus includes the wiping device.

In accordance with an aspect of the present invention, a wiping method includes a first wiping step in which a wiping member is moved while not coming into contact with a nozzle surface of a recording head but coming into contact with a liquid adhering to the nozzle surface; and a second step in which the wiping member is moved while coming into contact with the nozzle surface after the first wiping step.

The other features and advantages of the present disclosure will become more apparent from the following description. In the detailed description, reference is made to the accompanying drawings, and preferred embodiments of the present disclosure are shown by way of example in the accompanying drawings.

DETAILED DESCRIPTION

Figure 1:
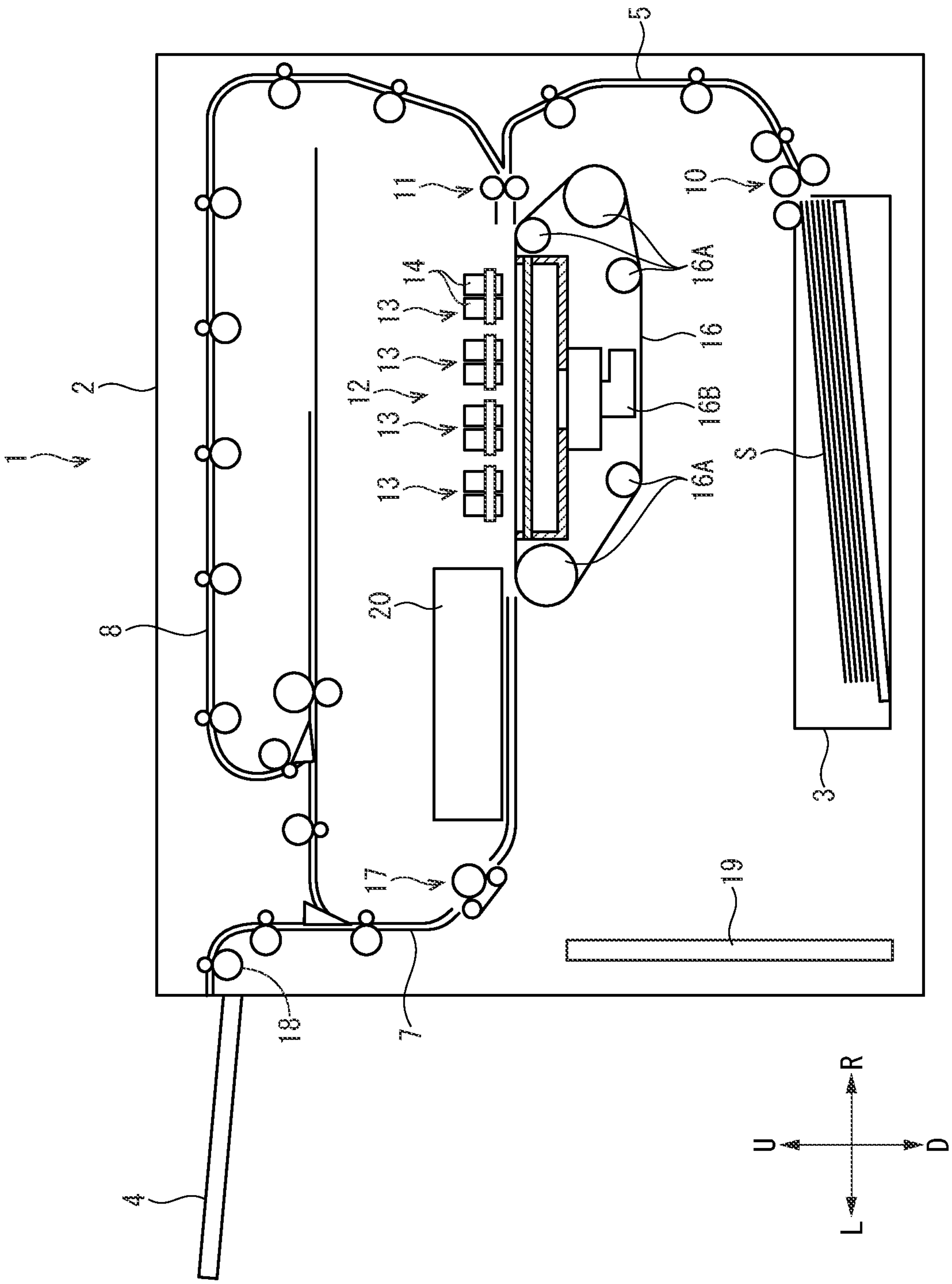
FIG. 1 is a front view schematically showing structure of an image forming apparatus an inner according to a first embodiment of the present disclosure.

Hereinafter, with reference to the attached drawings, one embodiment of the present embodiment will be described. In the following description, Fr, Rr, L, R, U and D marked in the drawings indicate the front, rear, left, right, upper and lower. Although terms indicating a direction or a position are used in the description, they are used for convenience of explanation and are not intended to limit the technical scope of the present disclosure.

[First Embodiment] With reference to FIG. 1, an image forming apparatus 1 according to a first embodiment will be described. FIG. 1 is a front view schematically showing an inner structure of the image forming apparatus 1.

The image forming apparatus 1 is an inkjet type printer which forms an image on a sheet S by ejecting ink droplets. The image forming apparatus 1 is provided with a box-shaped housing 2 in which various devices are stored. In the lower portion of the housing 2, a sheet feeding cassette 3 in which the sheet S is set is stored, and on the upper portion of the left side surface of the housing 2, a sheet discharge tray 4 on which the printed sheet S is stacked is provided. In the right side portion in the housing 2, a first conveyance path 5 along which the sheet S is conveyed from the sheet feeding cassette 3 toward a head unit 12 is formed. On the upstream portion of the first conveyance path 5, a sheet feeding part 10 is provided, and on the downstream portion of the first conveyance path 5, a registration roller 11 is provided.

The head unit 12 includes four line heads 13 corresponding to inks of four colors of black, cyan, magenta and yellow.

Each line head 13 includes three recording heads 14 for ejecting the ink droplets. The ink is supplied to each recording head 14 from an ink pack (not shown) of each color through a tube (not shown).

A conveyance belt 16 is provided below the head unit 12, and is stretched between a plurality of tension rollers 16A. Many through-holes (not shown) are formed in the conveyance belt 16, and a suction part 16B is provided inside the conveyance belt 16. A decurl device 17 which corrects the curl of the sheet S is installed on the left side of the head unit 12. A second conveyance path 7 along which the sheet S is conveyed from the decurl device 17 toward the sheet discharge tray 4 is formed in the left side portion in the housing 2, and a sheet discharge part 18 is provided on the downstream portion of the second conveyance path 7. A third conveyance path 8 along which the sheet S is conveyed to the registration roller 11 from the middle of the second conveyance path 7 is formed in the upper portion in the housing 2.

A controller 19 for appropriately controlling various controlled devices is provided inside the housing 2. The controller 19 includes a processer and the others for executing various kinds of arithmetic processing in accordance with programs and parameters stored in a memory. The controller 19 may be implemented by a logic circuit (hardware) formed in an integrated circuit or the like instead of the processer or the others for executing the program or the like.

[Image Forming Processing] The image forming processing will be described. The controller 19 appropriately controls various controlled devices to performs the image forming processing as follows.

The sheet feeding part 10 feeds the sheet S taken out from the sheet feeding cassette 3 to the first conveyance path 5. The registration roller 11 temporarily blocks the sheet S to correct the skew, and then sends the sheet S onto the conveyance belt 16 in accordance with the ejection timing of the ink droplets from the line head 13. The sheet S is conveyed while being sucked on the conveyance belt 16, and the head unit 12 (the line head 13) ejects the ink droplets onto the sheet S on the conveyance belt 16 to form (print) a full-color image. The sheet S passing under the head unit 12 is sent to the decurl device 17 to correct the curl.

The sheet S printed on one side surface is discharged to the sheet discharge tray 4 through the second conveyance path 7. When the double-side printing is performed, the sheet S printed on one side surface is conveyed along the third conveyance path 8, is turned upside down, and then is conveyed again toward the registration roller 11. Thereafter, an image is formed on the back surface of the sheet S in the same order as in the above-described one-side printing, and the curl of the double-side printed sheet S is corrected and then discharged to the sheet discharge tray 4.

Figure 2:
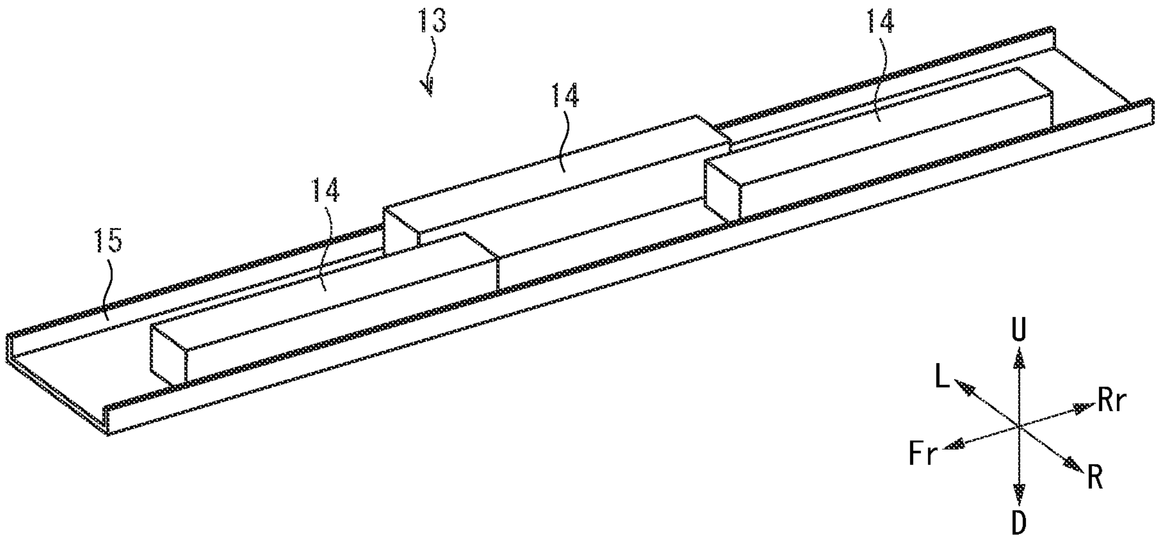
FIG. 2 is a perspective view showing a line head according to the first embodiment of the present disclosure.
Figure 3:
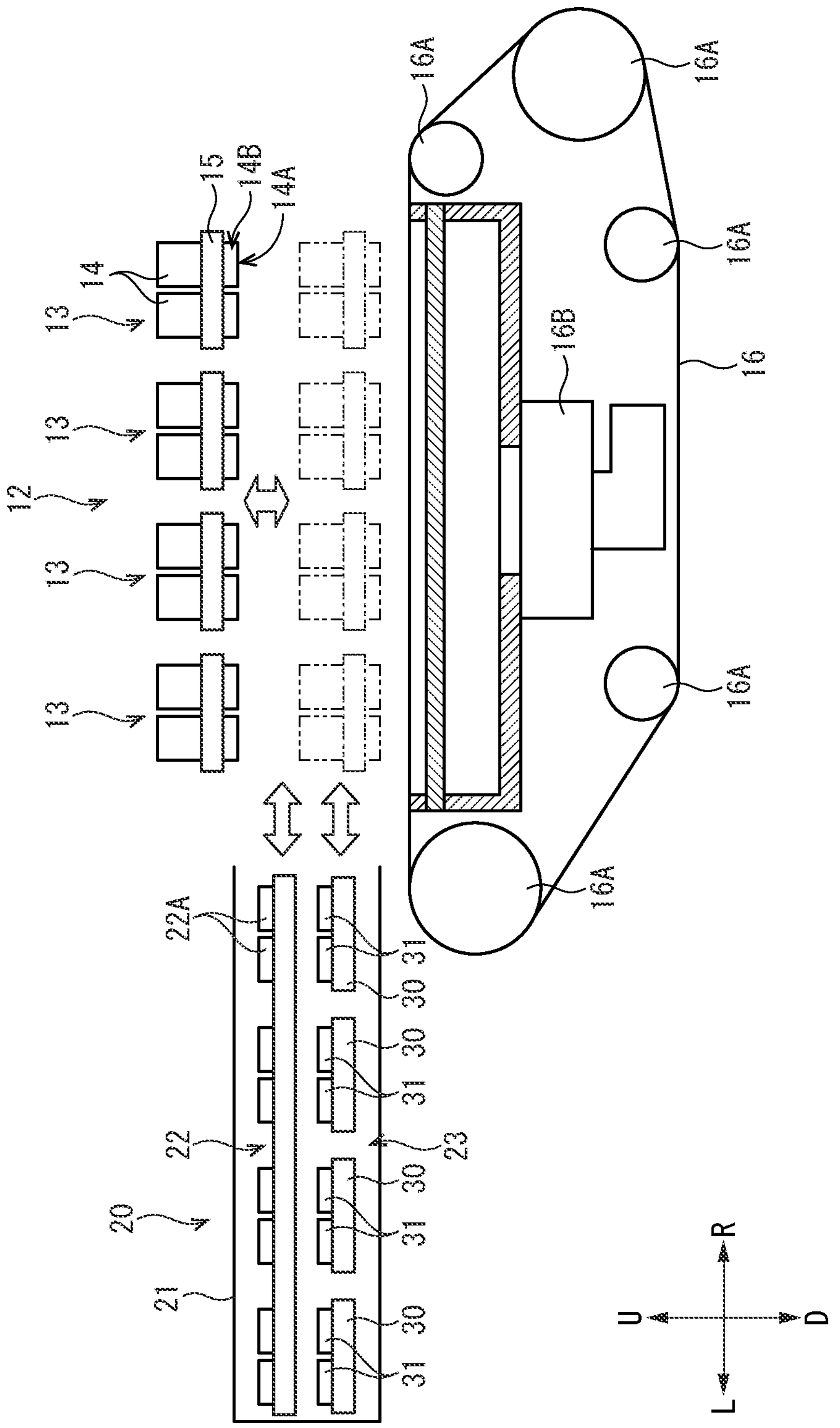
FIG. 3 is a front view showing a head unit and a maintenance device according to the first embodiment of the present disclosure.

The inkjet type image forming apparatus 1 is provided with a maintenance device 20 which performs maintenance of each recording head 14 mounted on each line head 13. Hereinafter, each line head 13 (the recording head 14) will be described with reference to FIG. 2 and FIG. 3 prior to the description of the maintenance device 20. FIG. 2 is a perspective view showing the line head 13. FIG. 3 is a front view showing the head unit 12 and the maintenance device 20. Since the four line heads 13 have the same structure and the three recording heads 14 mounted on the respective line heads 13 also have the same structure, the following description will mainly describe one line head 13 and one recording head 14.

[Line Head] As shown in FIG. 2, the line head 13 includes the three recording heads 14 and a head base 15 by which the three recording heads 14 are supported.

<Recording Head> The recording head 14 is made of metal material such as stainless steel, for example, and is formed in a substantially rectangular parallelepiped shape long in the front-and-rear direction. The lower surface of the recording head 14 is formed to be a nozzle surface 14A on which a plurality of nozzles (not shown) for ejecting the ink droplets are formed (see FIG. 3). The plurality of nozzles are arranged at intervals in the front-and-rear direction and the left-and-right direction on the nozzle surface 14A. In a housing of the recording head 14, a plurality of piezoelectric elements (not shown) are provided corresponding to the plurality of nozzles. The recording head 14 is a so-called piezoelectric inkjet head in which the ink 90 is ejected from the nozzle by applying a voltage to the piezoelectric element to deform it. Each piezoelectric element is electrically connected to the controller 19 to be driven and controlled. It should be noted that the recording head 14 is not limited to the piezoelectric type, and a thermal type ink ejection method or the like may be employed.

<Head Base> The head base 15 is made of metal material such as stainless steel, for example, and is formed in a substantially flat plate shape long in the front-and-rear direction. The head base 15 has three mounting holes (not shown) for mounting the three recording heads 14 disposed in a zigzag shape. That is, the three recording heads 14 are disposed in a zigzag shape. The lower portion of the recording head 14 is fitted into the mounting hole and protrudes below the head base 15 (see FIG. 3). The recording head 14 is mounted to the head base 15 with the nozzle surface 14A and the lower portion of the side surface 14B (outer circumferential surface) exposed below the head base 15 (see FIG. 3).

The head unit 12 (each line head 13) is provided so as to be movable up and down by a lifting device (not shown). The head unit 12 is movable up and down between a printing position (see the two-dot chain line in FIG. 3) which is close to the conveyance belt 16 and enables the head unit 12 to perform the above-described image forming processing, and a retracting position (see the solid line in FIG. 3) which is set above the printing position. By moving the head unit 12 to the retracting position, each recording head 14 can be maintained by the maintenance device 20 (its details will be described later). The lifting device is electrically connected to the controller 19 to be driven and controlled.

Figure 4:
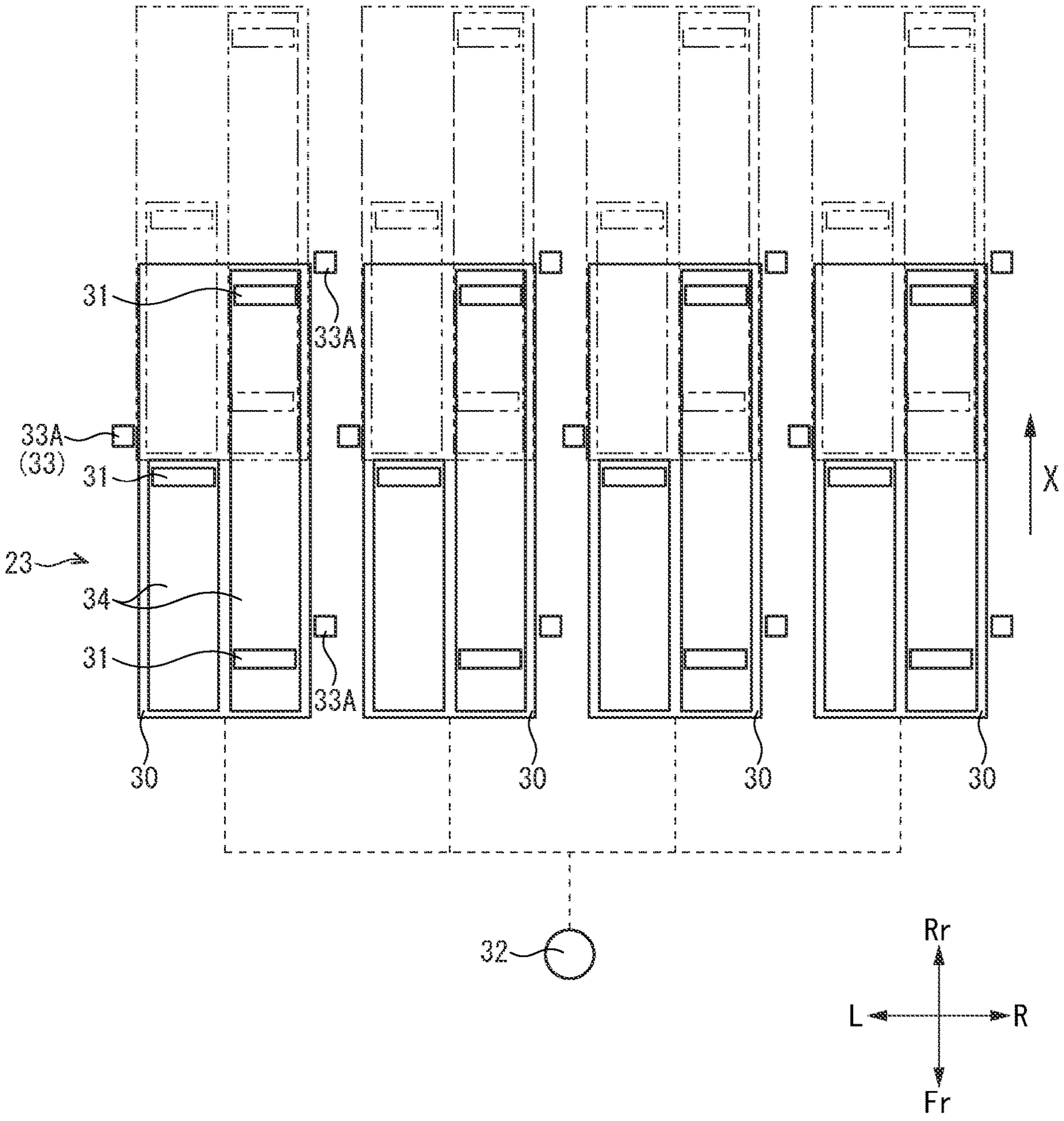
FIG. 4 is a plan view showing a wiping device according to the first embodiment of the present disclosure.

[Maintenance Device] Next, the maintenance device 20 will be described with reference to FIG. 3 and FIG. 4. FIG. 4 is a plan view showing the wiping device 23.

The maintenance device 20 is disposed inside the housing 2 on the left side of the head unit 12 (see FIG. 1). The maintenance device 20 has a function of preventing or repairing clogging of the recording head 14 (the nozzles).

As shown in FIG. 3, the maintenance device 20 includes a maintenance housing 21, a capping device 22, and the wiping device 23. The maintenance housing 21 is formed in a box shape with the right side surface open, and houses the capping device 22 and the wiping device 23. The capping device 22 and the wiping device 23 are individually moved in the left-and-right direction by a sliding device (not shown). The sliding device is electrically connected to the controller 19 to be driven and controlled so as to move the selected one of the capping device 22 and the wiping device 23.

<Capping Device> The capping device 22 includes a plurality of caps 22A corresponding to the plurality of recording heads 14 included in the head unit 12. The capping device 22 is provided so as to be movable in the left-and-right direction between a housing position where it is housed in the maintenance housing 21 and a capping position where it is disposed directly below the head unit 12 lifted to the retracting position. After the sliding device moves the capping device 22 from the housing position to the capping position, the lifting device lowers the head unit 12 moved to the retracting position, so that each cap 22A seals the nozzle surface 14A (the plurality of nozzles) of the recording head 14. This suppresses drying of the ink 90 in the nozzles so that it becomes possible to prevent clogging of the nozzles.

<Wiping Device> As shown in FIG. 3 and FIG. 4, the wiping device 23 includes four wiper carriages 30, a plurality of wipe blades 31, a moving part 32, and a cleaning liquid supplying part 33. Since the four wiper carriages 30 have the same structure and the plurality of wipe blades 31 have the same structure, the following description will mainly describe one wiper carriage 30 and one wipe blade 31.

(Wiper Carriage) The wiper carriage 30 is formed in a substantially flat plate shape long in the front-and-rear direction. The four wiper carriages 30 are provided so as to correspond to the four line heads 13. The wiping device 23 (the four wiper carriages 30) is provided so as to be movable in the left-and-right direction between a housing position where it is housed in the maintenance housing 21 and a wiping position where it is disposed directly below the head unit 12 lifted to the retreat position. The wiper carriage 30 is provided so as to be movable in the front-and-rear direction in a state where it is disposed at the wiping position.

(Wipe Blade) The three wipe blades 31 corresponding to the three recording heads 14 are provided in one wiper carriage 30 with upright posture. The wipe blade 31 as an example of the wiping member is made of elastic material such as synthetic rubber, for example, and is formed in a plate shape. The wipe blade 31 is formed wider than the dimension of the nozzle surface 14A in the left-and-right direction. A collection tray 34 (see FIG. 4) is provided between the wiper carriage 30 and the wipe blade 31.

(Moving Part) The moving part 32 (see FIG. 4) moves the wipe blade 31 in the front-and-rear direction (along the nozzle surface 14A) via the wiper carriage 30. The moving part 32 includes an actuator as a driving source such as an electric motor or a solenoid, and a drive transmission mechanism which converts the driving force of the actuator into linear movement in the front-and-rear direction and transmits it to the wiper carriage 30 (the wipe blade 31) (neither of which is shown). The moving part 32 (the actuator) is electrically connected to the controller 19 to be driven and controlled.

(Cleaning Liquid Supplying Part) The cleaning liquid supplying part 33 (see FIG. 4) attaches the cleaning liquid to the nozzle surface 14A. The cleaning liquid supplying part 33 includes a cleaning liquid tank (not shown) in which the cleaning liquid 91 is contained, and a plurality of ejecting parts 33A which ejects the cleaning liquid supplied from the cleaning liquid tank toward the nozzle surface 14A. Each ejecting part 33A is provided corresponding to the recording head 14. The cleaning liquid supplying part 33 (each ejecting part 33A) is electrically connected to the controller 19 to be driven and controlled. The cleaning liquid 91 may contain a solvent for dissolving the ink 90, for example.

[Outline of Wiping Operation] A wiping operation for wiping the nozzle surface 14A by the wiping device 23 will be described. The wiping operation may be performed after purging (discharging) the ink in the nozzles of the recording head 14.

After the sliding device moves the wiping device 23 from the housing position to the wiping position, the lifting device lowers the head unit 12 moved to the retracting position for a slight distance, so that the tip end portion (the upper end portion) of the wipe blade 31 comes into contact with or faces the nozzle surface 14A. In the present specification, as an example, the upper end portion of the wipe blade 31 comes into contact with or faces the front end portion (the wiping start position) on the nozzle surface 14A (see FIG. 6A described later). Next, the moving part 32 moves the wiper carriage 30 from the front side to the rear side (see the two-dot chain line in FIG. 4), so that the wipe blade 31 wipes the ink 90 off the nozzle surface 14A. The ink wiped by the wipe blades 31 drop in the collection tray 34, and then collected through a collection port (not shown) opened in the collection tray 34. In the present specification, a direction in which the ink is wiped (scraped) is sometimes called "a wiping direction X" (see FIG. 4). Although the wipe blade 31 is moved from the front side to the rear side, it may be moved from the rear side to the front side with the rear end portion on the nozzle surface 14A as the wiping start position.

By the way, in the conventional wiping operation, the wipe blade 31 is moved in the wiping direction X one time while being pressed on the nozzle surface 14A with a predetermined pressure, and wipes almost all of the ink off the nozzle surface 14A. The wipe blade 31 moving in the wiping direction X is curved on the downstream side in the wiping direction X (see FIG. 6E described later), and the wipe blade 31 pressed on the nozzle surface 14A is elastically deformed such that the left and right upper corner portions are protruded upward from the nozzle surface 14A. After purging, a relatively large amount of the ink may adhere on the nozzle surface 14A. In this case, when all of the ink on the nozzle surface 14A is wiped by one wiping operation, the wiped ink may leak from the left and right upper corner portions of the wipe blade 31 and then be raised up (go around) along the side surface 14B of the recording head 14. The ink adhering to the side surfaces 14B may drop at the image forming processing and contaminate the sheet S. Then, the wiping device 23 according to the first embodiment employs a wiping method in which the ink is wiped off the nozzle surface 14A in two steps.

Figure 5:
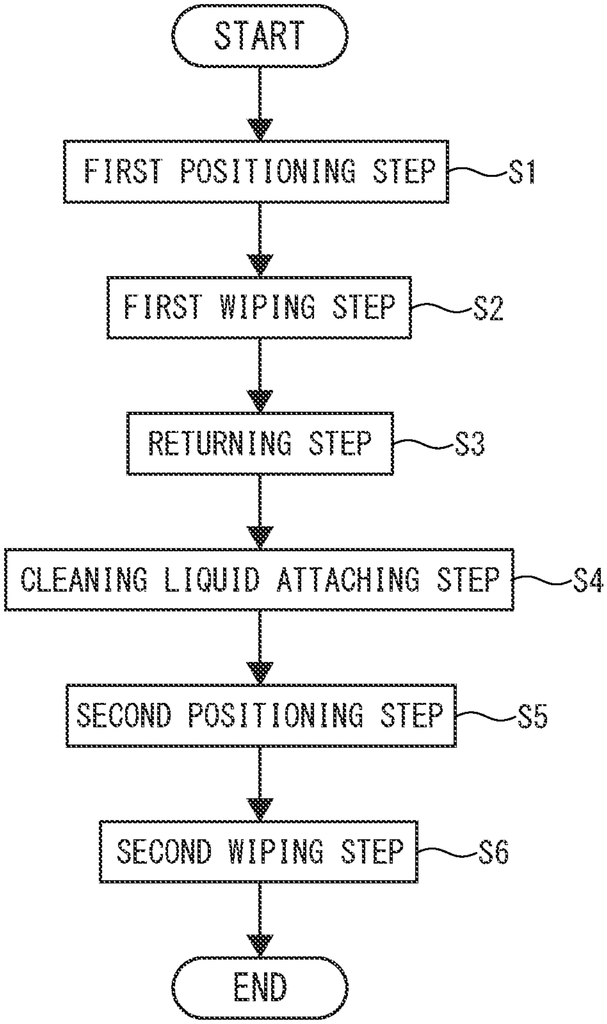
FIG. 5 is a flowchart explaining a wiping method according to the first embodiment of the present disclosure.

[Wiping Method] With reference to FIG. 5 and FIG. 6A to FIG. 6F, the wiping method of the wiping device 23 according to the first embodiment will be described. FIG. 5 is a flowchart explaining the wiping method. FIG. 6A to FIG. 6F are side views explaining the wiping method. In the following description, the wiping device 23 is disposed at the wiping position.

Figure 6A:
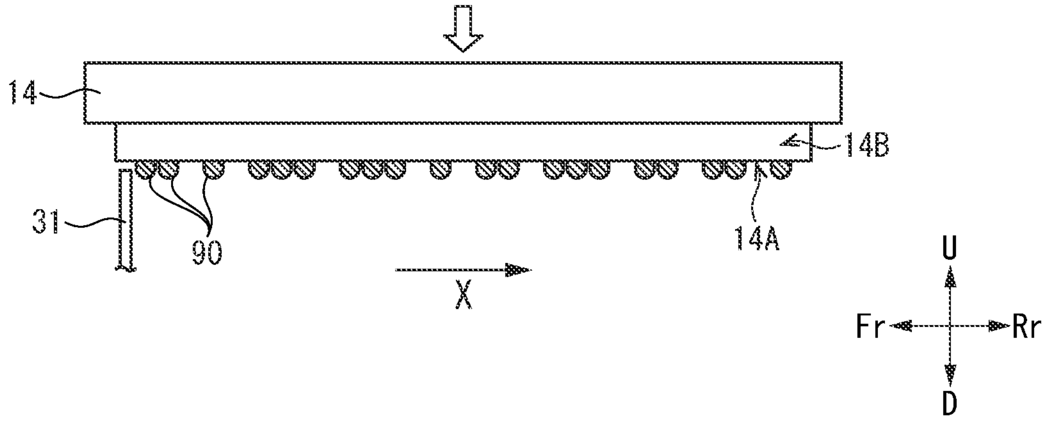
FIG. 6A is a side view explaining a first positioning step in the wiping method according to the first embodiment of the present disclosure.

The controller 19 controls the lifting device to perform a first positioning step S1 in which the head unit is lowered to a first wiping position where the upper end portion of the wipe blade 31 of the wiping device 23 does not come into contact with the nozzle surface 14A but comes into contact the ink 90 (the droplet) adhering to the nozzle surface 14A (enabling of coming into contact) (see FIG. 6A). That is, the upper end portion of the wipe blade 31 does not come into contact with the nozzle surface 14A with its nature posture. For example, the first wiping position may be set at a position about half the height of the droplet of the ink 90 apart (lowered) from the nozzle surface 14A by previously measuring the height (an average value or the like) of the droplet of the ink 90 on the nozzle surface 14A. Alternatively, the first wiping position may be set based on a result of detecting a position between the nozzle surface 14A and the upper end portion of the wipe blade 31 by a camera or an optical sensor (not shown).

Figure 6B:
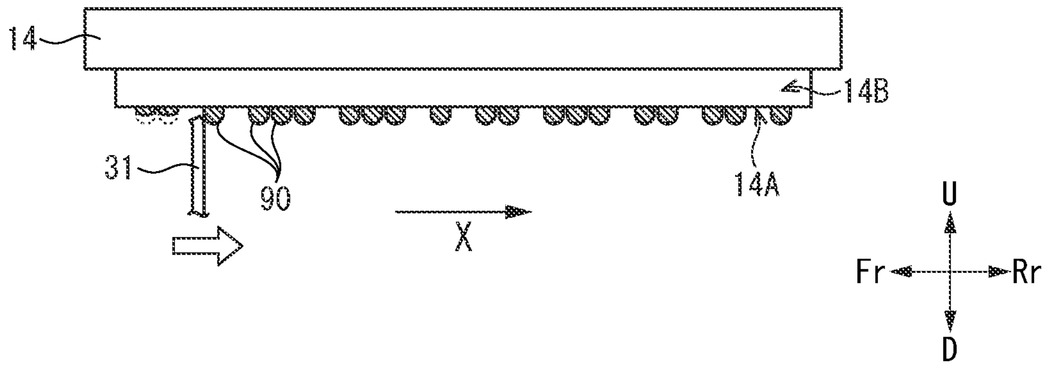
FIG. 6B is a side view explaining a first wiping step in the wiping method according to the first embodiment of the present disclosure.

Next, the controller 19 controls the moving part 32 to perform a first wiping step S2 in which the wiper carriage 30 is moved from the front side to the rear side (see FIG. 6B). In the first wiping step S2, a first wiping operation in which the wipe blade 31 is moved while not coming into contact with the nozzle surface 14A but coming into contact with the ink 90 adhering to the nozzle surface 14A is performed (see FIG. 6B). In the first wiping step S2, about half amount of the ink 90 (the droplet) is wiped by the wipe blade 31, and then drops on the collection tray 34. When the upper end portion of the wipe blade 31 reaches the rear end portion (the wiping end portion) on the nozzle surface 14A (see the solid line in FIG. 6C), the first wiping step S2 (the first wiping operation) is completed.

Figure 6C:
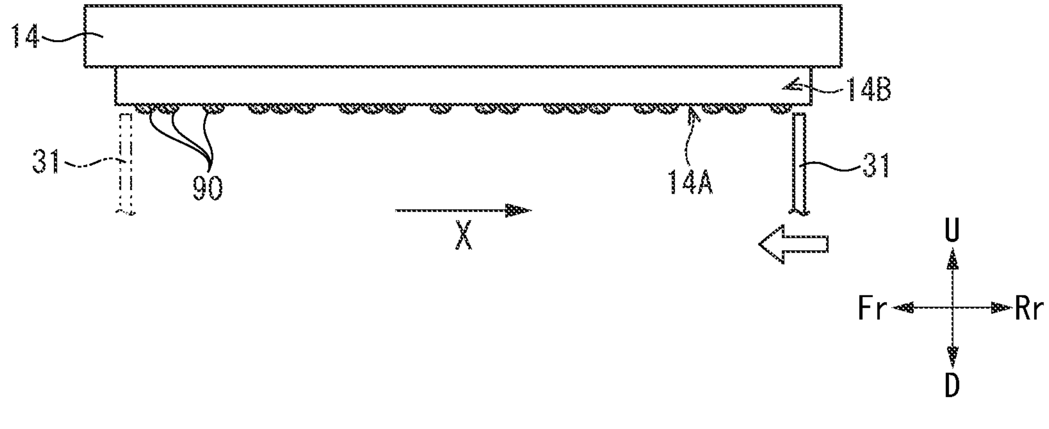
FIG. 6C is a side view explaining a retuning step in the wiping method according to the first embodiment of the present disclosure.

After the completion of the first wiping step S2, the controller 19 controls the moving part 32 to perform a returning step S3 in which the wiper carriage 30 (the wipe blade 31) is returned from the wiping end position (see the solid line in FIG. 6C) to the wiping start position (see the two-dot chain line in FIG. 6C). The controller 19 may controls the lifting device to lift the head unit 12 before the wiper carriage 30 is returned to the wiping start position (this case is not shown).

Figure 6D:
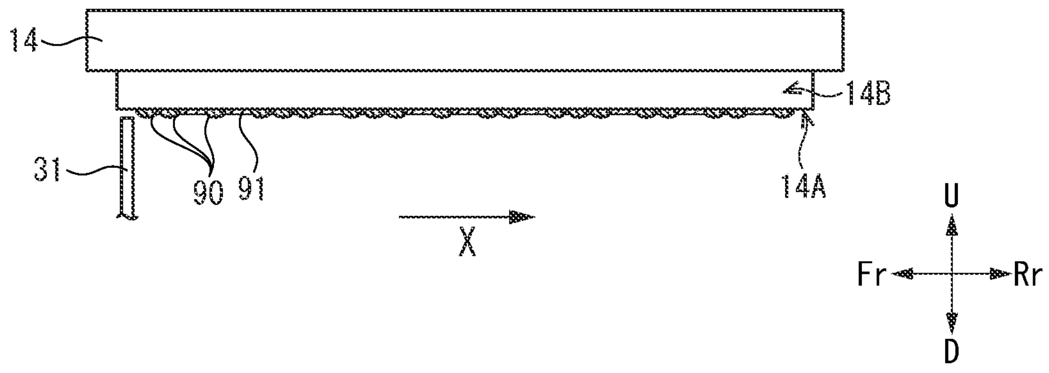
FIG. 6D is a side view explaining a cleaning liquid supplying step in the wiping method according to the first embodiment of the present disclosure.

Next, the controller 19 controls the cleaning liquid supplying part 33 (each ejecting part 33A) to perform a cleaning liquid attaching step S4 in which the cleaning liquid 91 is attached on the nozzle surface 14A (see FIG. 6D). In the cleaning liquid attaching step S4, each ejecting part 33A of the cleaning liquid supplying part 33 ejects the cleaning liquid 91 toward the nozzle surface 14A. The cleaning liquid 91 adheres to the nozzle surface 14A and the ink 90 on the nozzle surface 14A. The spray amount (the supply amount) of the cleaning liquid 91 is preferably smaller than the amount of the ink 90 removed in the first wiping operation (the first wiping step S2).

Figure 6E:
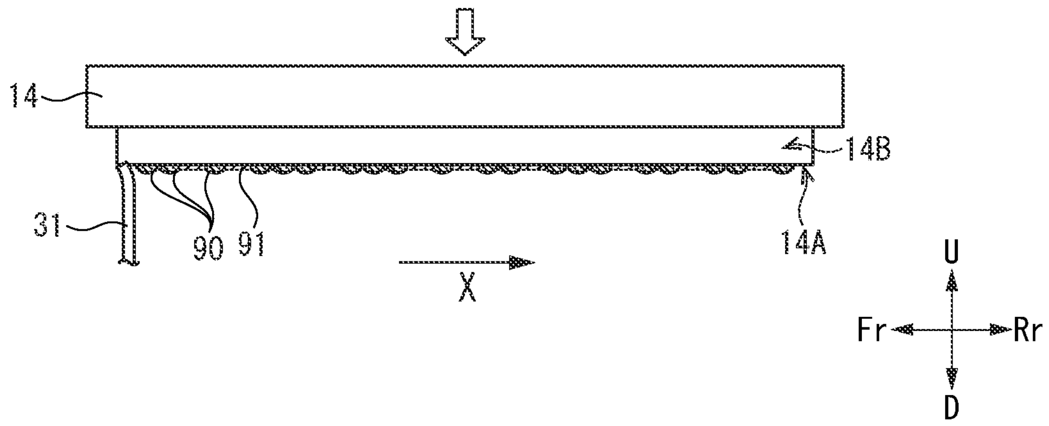
FIG. 6E is a side view explaining a second positioning step in the wiping method according to the first embodiment of the present disclosure.

Next, the controller 19 controls the lifting device to perform a second positioning step S5 in which the head unit 12 is lowered to a second wiping position where the upper end portion of the wipe blade 31 of the wiping device 23 comes into contact with the nozzle surface 14A (see FIG. 6E). The upper end portion of the wipe blade 31 is pressed against the nozzle surface 14A and elastically deformed. The second wiping position may be set based on a result of detection by a pressure sensor for detecting a pressure applied on the wipe blade 31, or a result of detection by detecting a position between the nozzle surface 14A and the upper end portion of the wipe blade 31 using a camera or an optical sensor (not shown), for example.

Figure 6F:
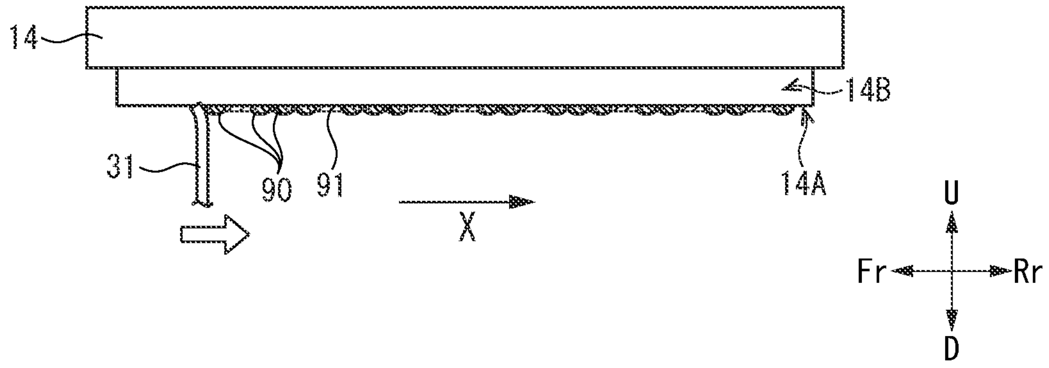
FIG. 6F is a side view explaining a second wiping step in the wiping method according to the first embodiment of the present disclosure.

Subsequently, the controller 19 controls the moving part 32 to perform a second wiping step S6 in which the wiper carriage 30 is moved from the front side to the rear side (see FIG. 6F). In the second wiping step S6, the wipe blade 31 performs a second wiping operation in which the wipe blade 31 moves while coming into contact with the nozzle surface 14A (see FIG. 6F). The wipe blade 31 moves in the wiping direction X while curving its upper end portion in a direction opposite to the wiping direction X. In the second wiping step S6, the ink 90 remaining on the nozzle surface 14A is wiped by the wipe blade 31 together with the cleaning liquid 91, and flows down onto the collection tray 34. When the upper end portion of the wipe blade 31 reaches the wiping end position on the nozzle surface 14A, the second wiping step S6 (the second wiping operation) is completed (this step is not shown).

As a result, the wiping processing by the wiping device 23 is completed. Hereinafter, the controller 19 controls the lifting device to lift the head unit 12 to the retracting position, controls the moving part 32 to return the wiper carriage 30 to the wiping start position, and controls the sliding device to return the wiping device 23 to the housing position.

The wiping device 23 (the wiping method) according to the first embodiment described above is configured such that after the first wiping operation (the first wiping step S2) in which the wipe blade 31 (its upper end portion) is moved while coming into contact with only the ink 90 (the ink droplet) on the nozzle surface 14A is performed, the second wiping operation (the second wiping step S6) in which the wipe blade 31 (its upper end portion) is moved while pressing it against the nozzle surface 14A is performed. According to this configuration, the second wiping operation can be performed in a state the amount of ink 90 on the nozzle surface 14A is reduced by the first wiping operation. In other words, the ink 90 on the nozzle surface 14A can be wiped (scraped) by the dispersed two wiping operations. As a result, the amount of the ink 90 to be wiped off in one wiping operation is greatly reduced, so that the movement (going around) of the ink 90 to the side surfaces 14B of the recording head 14 with the wiping of the nozzle surface 14A can be suppressed.

The wiping device 23 (the wiping method) according to the first embodiment is configured such that the cleaning liquid 91 is supplied on the nozzle surface 14A between the first wiping operation and the second wiping operation. According to this configuration, since the amount of the ink 90 on the nozzle surface 14A is reduced, the remaining ink 90 can be efficiently removed with a small amount of the cleaning liquid 91. As a result, the ink 90 adhering to the nozzle surface 14A can be surely removed while suppressing the ink 90 from going around the side surfaces 14B of the recording head 14 with the second wiping operation.

The wiping method according to the first embodiment is configured such that the wipe blade 31 moves in the wiping direction X to wipe the nozzle surface 14A, and after the first wiping step S2 is performed, the returning step S3 is performed to return the wiper carriage 30 (the wipe blade 31) to the wiping start position. However, the present disclosure is not limited to the configuration. The moving part 32 may reciprocate the wiper carriage 30 (the wipe blade 31) in the front-and-rear direction. For example, the returning step S3 may be omitted, and after the first wiping step S2 (the first wiping operation) is performed, the cleaning liquid attaching step S4, the second positioning step S5, and the second wiping step S6 (the second wiping operation) are successively performed, and in the second wiping step S6, the wipe blade 31 may be moved from the rear end portion on the nozzle surface 14A toward the front end portion. That is, the wipe blade 31 may be configured to perform the first wiping operation on the forward path from the wiping start position on the nozzle surface 14A to the wiping end position, and to perform the second wiping operation in the return path from the wiping end position on the nozzle surface 14A to the wiping start position.

Further, the wiping device 23 (the wiping method) according to the first embodiment is configured such that the cleaning liquid supplying part 33 supplies the cleaning liquid 91 between the first wiping operation and the second wiping operation, but the present disclosure is not limited to the configuration. For example, the cleaning liquid supplying part 33 may supply the cleaning liquid 91 before the first wiping operation (the first wiping step S2). The cleaning liquid 91 may be supplied on the upstream or downstream side in the moving direction of the wipe blade 31 during the first wiping operation in which the ink 90 is wiped. That is, the first wiping step S2 and the cleaning liquid attaching step S4 may be performed synchronously. Alternatively, the cleaning liquid supplying part 33 may supply the cleaning liquid 91 on the downstream side in the moving direction of the wipe blade 31 during the second wiping operation in which the ink 90 is wiped. That is, the second wiping step S6 and the cleaning liquid attaching step S4 may be performed synchronously. In the cleaning liquid attaching step S4, the cleaning liquid supplying part 33 may attach the cleaning liquid 91 to the nozzle surface 14A before the wipe blade 31 wipes the ink 90 off the nozzle surface 14A in the second wiping step S6 (the second wiping operation).

Figure 7:
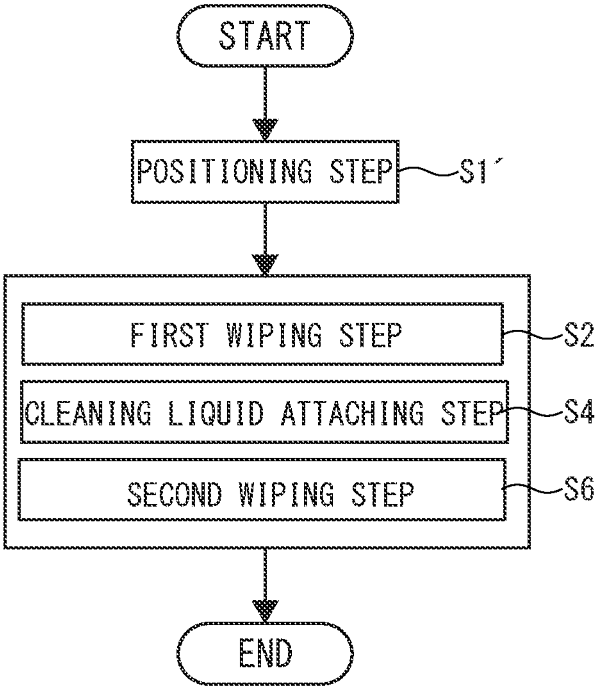
FIG. 7 is a flowchart explaining the wiping method according to a second embodiment of the present disclosure.
Figure 8A:
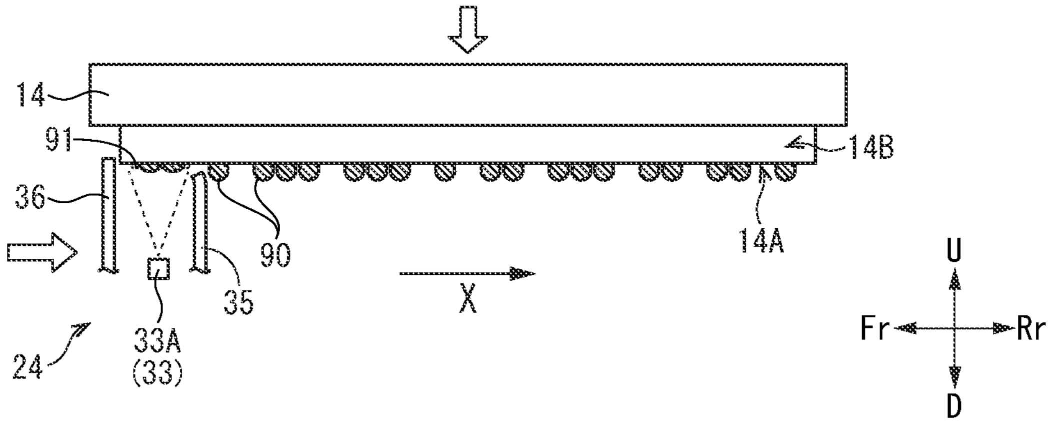
FIG. 8A is a side view explaining the positioning step in the wiping method according to the second embodiment of the present disclosure.
Figure 8B:
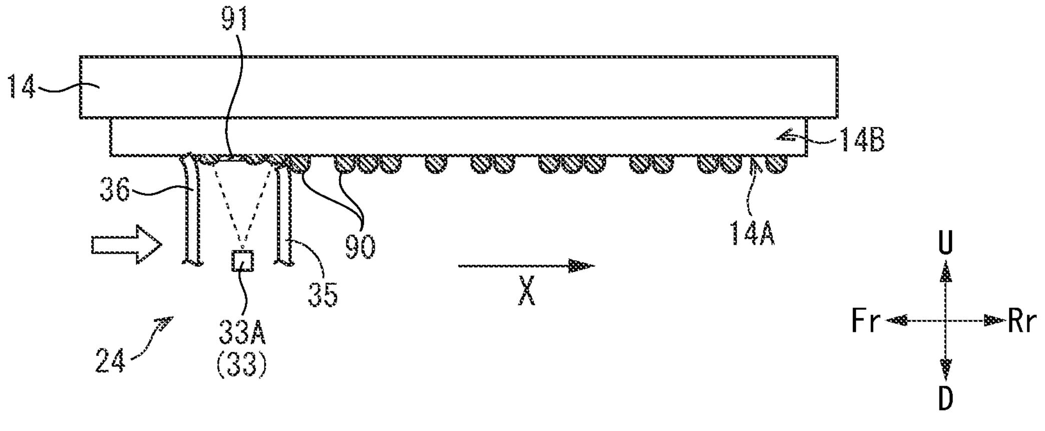
FIG. 8B is a side view explaining the first to the second wiping steps and the others in the wiping method according to the second embodiment of the present disclosure.

[Second Embodiment] With reference to FIG. 7 and FIG. 8A to FIG. 8B, the wiping device 24 according to a second embodiment will be described. FIG. 7 is a flowchart explaining the wiping method. FIG. 8A to FIG. 8B are side views explaining the wiping method. In the following description, the components similar to those of the wiping device 23 (the wiping method) according to the first embodiment are denoted by the same reference numerals, and similar descriptions are omitted.

In the wiping device 23 according to the first embodiment, one wipe blade 31 wipes the nozzle surface 14A of one recording head 14. The wiping device 24 according to the second embodiment is different from the wiping device 23 according to the first embodiment in that two wipe blades 35 and 36 wipe the nozzle surface 14A of one recording head 14.

As shown in FIG. 8A, the wiping device 24 includes a first wipe blade 35 (a first wiping member) used for a first wiping operation, and a second wipe blade 36 (a second wiping member) used for a second wiping operation. The second wipe blade 36 is provided in front of the first wipe blade 35 (on the upstream side in the moving direction (the wiping direction X)). The first wipe blade 35 and the second wipe blade 36 are formed in a substantially plate-like shape, and are arranged at intervals in the wiping direction X. The second wipe blade 36 is formed slightly higher than the first wipe blade 35 (for example, about half the height of the ink droplet).

The moving part 32 synchronously moves the first wipe blade 35 and the second wipe blade 36 via the wiper carriage 30. That is, the first and second wipe blades 35 and 36 move together in the wiping direction X. Each ejecting part 33A is mounted on the wiper carriage 30 between the two wipe blades 35 and 36. The moving part 32 moves each ejecting part 33A synchronously with the two wipe blades 35 and 36 via the wiper carriage 30.

[Wiping Method] The wiping method by the wiping device 24 according to the second embodiment will be described.

The controller 19 controls the lifting device to perform a positioning step S1' in which the head unit 12 is lowered to a wiping position where the upper end portion of the first wipe blade 35 comes into contact with only the ink 90 adhering to the nozzle surface 14A (making the contact possible) and the upper end portion of the second wipe blade 36 comes into contact with the nozzle surface 14A (see FIG. 8A).

Subsequently, the controller 19 controls the moving part 32 to synchronously perform the first wiping step S2 and the second wiping step S6 (see FIG. 8B). The first wiping operation in which the first wipe blade 35 moves while coming into contact with only the ink 90 adhering to the nozzle surface 14A is performed (see FIG. 8A), and then the second wiping operation in which the second wipe blade 36 on the upstream side of the first wipe blade 35 moves while coming into contact with the nozzle surface 14A is performed so as to follow the first wiping operation (see FIG. 8B). Further, the controller 19 controls the cleaning liquid supplying part 33 (each ejecting part 33A) to perform the cleaning liquid attaching step S4 in synchronization with the first and second wiping steps S2 and S6 (see FIG. 8A to FIG. 8B). The cleaning liquid supplying part 33 (each ejecting part 33A) ejects the cleaning liquid 91 toward the nozzle surface 14A between the first wipe blade 35 and the second wipe blade 36 while moving in the wiping direction X.

When the upper end portion of the first wipe blade 35 reaches the wiping end position on the nozzle surface 14A, the first wiping step S2 is completed, and the cleaning liquid attaching step S4 is also completed (the ejecting of the cleaning liquid 91 is stopped). When the upper end portion of the second wipe blade 36 reaches the wiping end position on the nozzle surface 14A, the second wiping step S6 is completed.

As a result, the wiping processing by the wiping device 24 is completed. Hereinafter, the controller 19 controls the lifting device to lift the head unit 12 to the retracting position, controls the moving part 32 to return the wiper carriage 30 to the wiping start position, and controls the sliding device to return the wiping device 24 to the housing position.

The wiping device 24 (the wiping method) according to the second embodiment described above is configured such that the first wipe blade 35 for the first wiping operation and the second wipe blade 36 for the second wiping operation are arranged side by side in the moving direction and are moved together. According to this configuration, the two wiping operations (the two wiping steps S2 and S6) can be performed at the same time. As a result, the time required for wiping the nozzle surface 14A can be greatly reduced as compared with the case where the second wiping operation is performed after the completion of the first wiping operation (the wiping device 23 according to the first embodiment). Further, the same effect as that of the wiping device 23 (the wiping method) according to the first embodiment can be obtained, for example, the ink 90 can be prevented from going around the side surfaces 14B of the recording head 14 with the wiping of the nozzle surface 14A.

The wiping device 24 (the wiping method) according to the second embodiment is configured such that the cleaning liquid supplying part 33 sprays the cleaning liquid 91 on the nozzle surface 14A between the first wipe blade 35 and the second wipe blade 36, but the present disclosure is not limited the configuration. For example, the cleaning liquid 91 may be sprayed before the first and second wiping operations (the first and second wiping steps S2 and S6), or the cleaning liquid 91 may be sprayed on the downstream side in the moving direction of the first wipe blade 35 during a time when the ink 90 is being wiped.

The wiping devices 23 and 24 according to the first and second embodiments employs the plate-shaped wipe blade 31 as an example of the wiping member, but the present disclosure is not limited to this. As another example of the wiping member, a wiping cloth such as a nonwoven fabric may be employed (not shown). In this case, for example, the wiping cloth formed in a belt-like shape may be wound on one roller, and the wiping cloth may be rewound on another roller while being pressed against the nozzle surface 14A (this case is not shown). In this case, the cleaning liquid supplying part 33 may attach the cleaning liquid 91 to the wiping cloth instead of the nozzle surface 14A (not shown).

Further, the wiping devices 23 and 24 according to the first and second embodiments are configured such that the cleaning liquid supplying part 33 sprays the cleaning liquid 91 onto the nozzle surface 14A, but the present disclosure is not limited to this, and the cleaning liquid 91 may be supplied onto the nozzle surface 14A by a roller or the like (not shown). The cleaning liquid supplying part 33 (the cleaning liquid attaching step S4) may be omitted (this case is not shown).

The wiping devices 23 and 24 according to the first and second embodiments wipe the ink 90 (an example of a liquid) on the nozzle surface 14A, but the present disclosure is not limited thereto. As another example of the liquid ejected from the nozzle of the recording head 14, a water, a liquid adhesive, a liquid synthetic resin or the like may be used, and the wiping devices 23 and 24 may wipe these liquids off the nozzle surface 14A.

Further, although the wiping devices 23 and 24 according to the first and second embodiments are controlled by the controller 19 for controlling the entire image forming apparatus 1, but the disclosure is not limited thereto. A dedicated controller (not shown) for controlling the wiping devices 23 and 24 may be provided in addition to the controller 19.

In the image forming apparatus 1 according to the above embodiments, the three recording heads 14 are mounted on the line head 13, but the present disclosure is not limited to this, and one or more recording heads 14 may be mounted on the line head 13. Although the plurality of recording heads 14 are arranged in a zigzag shape on the head base 15, the arrangement of the recording heads may be freely changed, for example, arranged in a row.

In the image forming apparatus 1 according to the above embodiments, the head unit 12 is lifted by the lifting device when the maintenance device 20 performs the maintenance operation, but the present disclosure is not limited to this. For example, the head unit 12 may be immovably provided, the lifting device may lift the maintenance device 20 (the capping device 22 and the wiping device 23) to bring the cap 22A and the wipe blades 31, 35, and 36 into contact with the nozzle surface 14A.

The image forming apparatus 1 according to the above embodiment is a color printer, but is not limited to this, and may be a monochrome printer, a copying machine, a facsimile machine, or the like.

Although the present disclosure has been described with respect to specific embodiments, the present disclosure is not limited to the embodiments described above. Those skilled in the art will be able to modify the above embodiments without departing from the scope and spirit of the present disclosure.

The invention claimed is:

1. A wiping device comprising:

a wiping member which wipes a liquid off a nozzle surface of a recording head;

a moving part which moves the wiping member along the nozzle surface in a predetermined moving direction; and a cleaning liquid supplying part which includes a plurality of ejecting parts which ejects a cleaning liquid toward the nozzle surface and attaches the cleaning liquid to the nozzle surface, wherein the wiping member performs a first wiping operation in which the wiping member is moved while not coming into contact with the nozzle surface but coming into contact with the liquid adhering to the nozzle surface, and a second wiping operation in which the wiping member is moved while coming into contact with the nozzle surface after the first wiping operation, before the wiping member wipes off the liquid adhering to the nozzle surface in the second wiping operation, the cleaning liquid supplying part attaches the cleaning liquid to the nozzle surface by ejecting the cleaning liquid from the ejecting parts, and an amount of the ejected cleaning liquid from the ejecting parts is smaller than an amount of the liquid removed in the first wiping operation.

2. The wiping device according to claim 1, wherein the wiping member includes:

a first wiping member used for the first wiping operation; and a second wiping member provided on an upstream side of the first wiping member in the moving direction and used for the second wiping operation, and the moving part moves the first wiping member and the second wiping member synchronously.

3. The wiping device according to claim 1, wherein in the first wiping operation, the wiping member wipes the liquid by an amount of half a height of the liquid adhering to the nozzle surface.

4. A the image forming apparatus comprising the wiping device according to claim 1.

5. A wiping method comprising:

a first wiping step in which a wiping member is moved while not coming into contact with a nozzle surface of a recording head but coming into contact with a liquid adhering to the nozzle surface;

a second step in which the wiping member is moved while coming into contact with the nozzle surface after the first wiping step; and a cleaning liquid supplying step in which a cleaning liquid is attached to the nozzle surface or the wiping member before the wiping member is wiped off the liquid adhering to the nozzle surface in the second wiping step, wherein an amount of the attached cleaning liquid at the cleaning liquid supplying step is smaller than an amount of the liquid removed in the first wiping step.

6. The wiping method according to claim 5, wherein the first wiping step and the second wiping step are performed synchronously.

* * * * *